May 30, 1944.  E. E. JURS ET AL  2,350,042
TANK GAUGE
Filed April 13, 1942  2 Sheets-Sheet 1
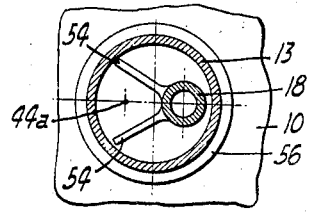
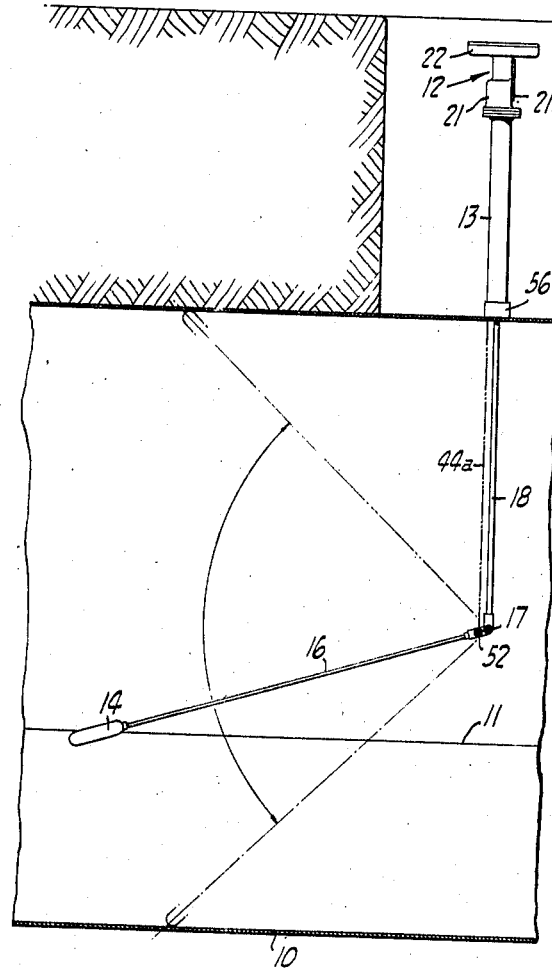
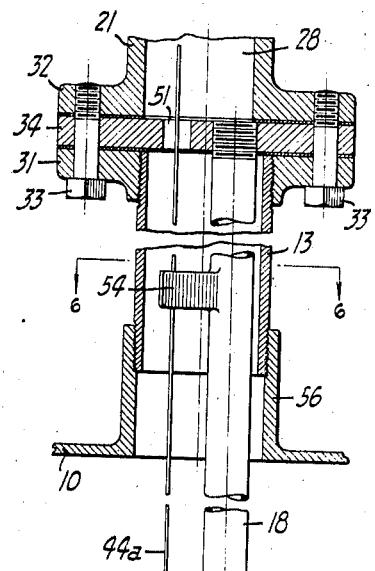
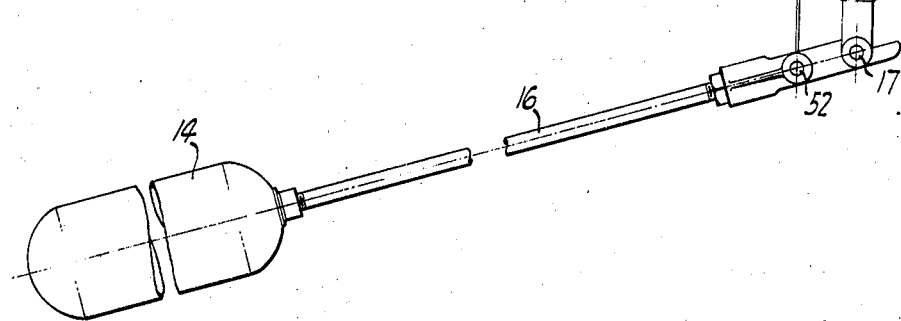
INVENTORS
Eugene E. Jurs
John J. Denham
BY
Paul O. Fehr
ATTORNEY May 30, 1944.　　E. E. JURS ET AL　　2,350,042
TANK GAUGE
Filed April 13, 1942　　2 Sheets-Sheet 2
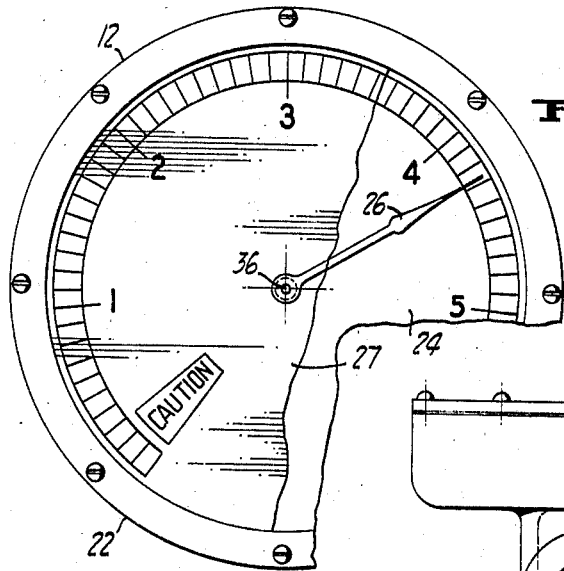
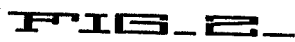
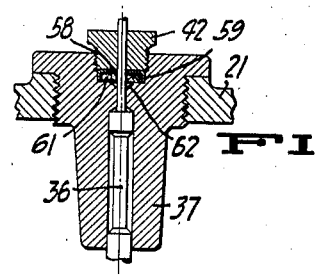
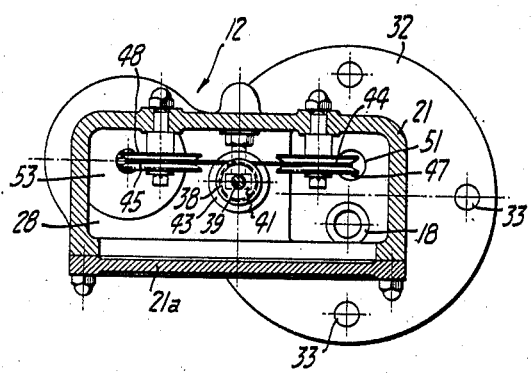
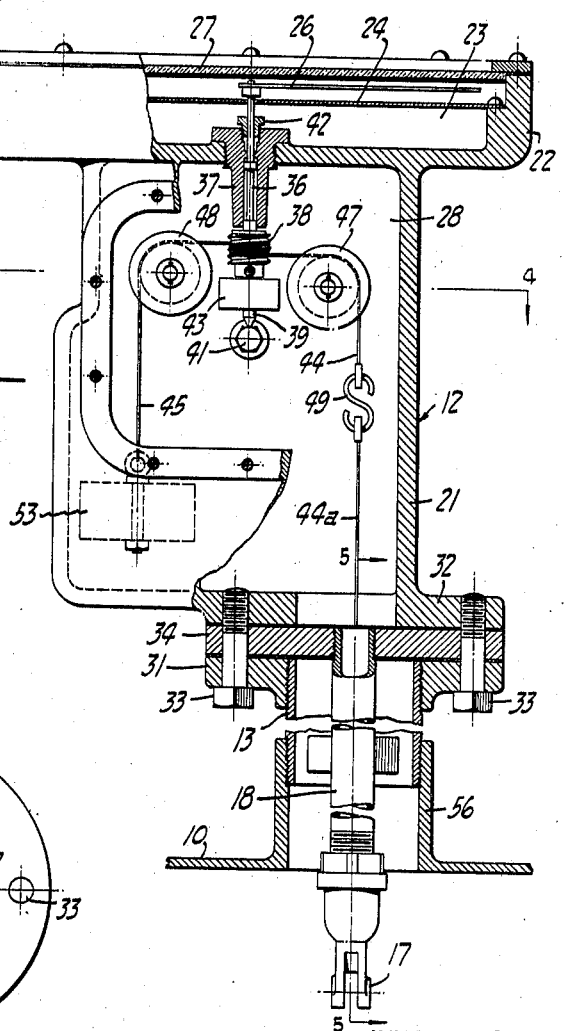
INVENTORS
Eugene E. Jurs
John L. Denham
BY Paul D. Flehr
ATTORNEY Patented May 30, 1944

2,350,042

UNITED STATES PATENT OFFICE 2,350,042

TANK GAUGE

Eugene E. Jurs, Oakland, and John J. Denham, Orinda, Calif., assignors to Shand and Jurs Company, a partnership composed of Albert E. Jurs, Raymond M. Young, Peter C. Jurs, and Eugene E. Jurs Application April 13, 1942, Serial No. 438,706

3 Claims. (Cl. 73—317)

This invention relates generally to liquid tank gauges and particularly to gauges adapted for use with underground storage tanks.

With underground storage tanks it is customary to locate the indicator of the gauge at some distance above the tank, and to operatively connect the indicator to a movable float or like mechanism within the tank itself. When inflammable hydrocarbon liquids like gasoline are stored within the tank, it is common practice to displace the gasoline with water under pressure. A practical gauge for tanks of this character must be sealed to prevent escape of vapor and must be capable of accurately indicating the level of the interface between the lower body of displacing water and the gasoline.

It is an object of the present invention to provide an improved liquid gauge of the above character. Our gauge is characterized by the ease with which it may be installed in connection with underground tanks, the relatively small amount of friction involved in the operating parts, and the high degree of accuracy of indication secured. In addition, the gauge is relatively simple in construction and operation, and is capable of operation over long periods without servicing or repair.

Additional objects and features of the invention will appear from the following description in which the preferred embodiment has been set forth in detail in conjunction with the accompanying drawings.

Referring to the drawings:

Figure 1 is a side view illustrating generally the manner in which our gauge is applied to an underground tank;

Figure 2 is a side elevational view, partly in cross section, showing the indicator mechanism of our gauge and its manner of installation upon a subterranean tank;

Figure 3 is a plan view of the gauge as shown in Figure 2;

Figure 4 is a cross sectional detail taken along the line 4—4 in Figure 2;

Figure 5 is a side elevational view, in cross section, showing the manner in which the float is mounted upon the other parts of the gauge, and is connected to the operating cable;

Figure 6 is a cross sectional detail taken along the line 6—6 of Figure 5;

Figure 7 is an enlarged cross sectional detail showing the gland about shaft 36.

Referring first to Figure 1, we have shown a subterranean tank 10 such as is suitable for the storage of gasoline. Assuming that water under pressure is being used to displace the gasoline, line 11 represents the interface between the lower body of water and the upper body of gasoline. The indicating mechanism 12 of the gauge is disposed above the tank near the ground level and is connected by pipe 13 to the top of the tank. Float 14 is within the tank and has a volume-weight ratio such that it takes a position along the interface 11. The float is attached to arm 16, which in turn has a pivot connection 17 to the lower end of the mounting pipe 18.

Referring now to Figures 2 to 4 inclusive, the indicating mechanism 12 consists of a housing 21, the upper end of which has an annular flange 22 to form the chamber 23. Within this chamber there is mounted a graduated dial 24, and the rotary indicating pointer 26. The transparent window or cover plate 27 encloses these parts. One side of the housing is formed by the removable plate or closure 21a.

The chamber 23 in the main part of the housing is sealed with respect to the atmosphere, and is in communication with the interior of the tank. For attaching this housing to the pipe 13, the upper end of this pipe is shown provided with the attaching flange 31, which is attached by screws 33 to a base portion 32 on the lower end of housing 21. A plate 34 is clamped between flange 31 and base portion 32, and this plate forms a mounting for the upper end of the pipe 18.

To describe the operating parts of the indicating mechanism, the pointer 26 is secured to the upper end of a rotatable shaft 36, which in turn is journalled in the fitting 37. The inner part of shaft 36 carries a spool 38, and the lower end of the shaft has a simple ball type thrust bearing 39 which engages the stationary bearing block 41. A gland below the gland fitting 42 prevents leakage about the shaft 36 from the inner chamber 28. A counter-balancing weight 43 is also mounted upon the inner end of shaft 36 below the spool 38, and this weight is circular or in the form of a wheel so that its weight is applied directly downwardly upon the thrust bearing 39.

The periphery of spool 38 is engaged by the cables 44 and 45. These cables should have considerable flexibility and should be formed of material which will not rust or corrode. For example, they can be of stranded wire construction and of stainless steel. The periphery of spool 38 is preferably threaded, and the cables 44 and 45 wrapped between the threads in the manner shown in Figures 2 and 4, whereby the cables extend or lead from the spool in opposite directions and in a common plane. Assuming that cables 44 and 45 may, in effect, be the same cable, two complete wraps of the cable can be taken upon the spool 38, with the mid point of the wrapped portion anchored to the spool. A pair of sheaves 47 and 48 are mounted within the housing 21 adjacent opposite sides of the spool 38, and on horizontal axes. The cables 44 and 45 engage over these sheaves, as illustrated in Figures 2 and 4, and preferably the mounting of the two sheaves is offset slightly in a vertical direction, as shown in Figure 4, so that for an intermediate position of pointer 26 the cables extending from sheave 38 will be in alignment and substantially horizontal.

The depending end of cable 44 is attached by suitable means, such as an S hook 49, to a cable 44a which extends downwardly through an opening 51 in plate 34 and through the connecting pipe 13. The lower end of cable 44a is attached at 52 to the float arm 16. Cable 45 has a counterweight 53 secured to its depending end, and this weight applies constant tension to all of the cables.

Previous reference has been made to the pipe 18 which extends down through the pipe 13 to form a fulcrum mounting for the float arm 16. As shown in Figures 5 and 6, it is desirable that pipe 18 be offset to one side of the pipe 13 to thus form ample room for the cable 44a. Lugs 54 are shown carried by pipe 18 to engage the inner walls of the pipe 13, and serve to steady the pipe 18 against lateral movement. The lower end of pipe 13 can be attached by any suitable means to the top of the tank, as for example by means of a coupling flange 56 which is welded to the top of the tank.

Figure 7 shows a desirable type of gland for the shaft 36. Below the threaded gland fitting 42 there is a metal follower 58 in the form of a disc having a rim or flange 59. Below this follower there is a packing 61 formed of suitable resilient material such as resilient synthetic rubber and which normally fits snugly about the shaft. Below the central portion of the packing 61 the journal fitting 37 is relieved to form the recess 62. When the threaded member 42 is screwed down upon the follower 58, the follower prevents excessive tightening of the packing upon the shaft.

Operation of the gauge described above is as follows: Counterweight 53 applies constant tension to the cables 44a, 44 and 45. The manner in which cables 44 and 45 engage and extend from spool 38 prevents the cable pull from creating force components either laterally or longitudinally of the shaft 36. By virtue of this feature, undue friction or wear on the bearings of shaft 36 are avoided. Float 14 takes a position according to the level of the interface 11, and upon movement of the float arm due to a change in level of the interface, this motion is transmitted through the cables 44a and 44 to the spool 38. Pressure within the tank acts upwardly upon shaft 36 and if permitted to force the shaft upwardly would cause considerable friction. However, weight 43 provides sufficient force to slightly more than counterbalance the upward fluid pressure, so that the lower thrust bearing will carry the shaft at all times. This insures a minimum amount of friction against turning movement of the shaft 36 and avoids use of an exterior thrust bearing.

The gauge described above is simple in construction and is capable of a relatively high degree of accuracy. It can be readily installed and adjusted for proper operating condition. In this connection note that the float and the float arm are made so that these parts can be attached to the lower end of pipe 18 and inserted within the tank through the pipe 13. After the parts have been placed in operating position, it is a simple matter to adjust or calibrate the gauge by temporarily removing the side plate 21a of the housing, and by adjusting the length of the cable 44a.

While the invention has been disclosed in connection with an underground tank, it is evident that it can be used in other instances where it is desired to secure an accurate indication without permitting escape of gases or vapor. Likewise the device can be arranged to indicate the level of a liquid as distinguished from the level of the interface between two liquids.

We claim:

1. In gauging apparatus for application to a liquid tank, a closed housing located exterior of the tank, a hollow member connecting the housing to the tank, a movable float disposed within the tank, indicating means carried within the housing and including a vertically disposed rotatable indicator shaft, a spool secured to the shaft, a pair of spaced sheaves mounted on a horizontal axis and disposed upon opposite sides of the indicator shaft in a plane substantially tangent to the periphery of the spool, a cable wrapped about the spool and extended in said plane to engage over one of said spaced sheaves and to thence extend downwardly for attachment to the float, another cable likewise wrapped about the spool and extended in said plane to engage over the other one of said spaced sheaves, and a counterbalance weight secured to the depending end of said second named cable, whereby constant tension is applied to both said cables.

2. In gauging apparatus for application to a liquid tank, a closed housing located exterior of the tank, a hollow member connecting the housing to the tank, a movable float disposed within the tank, indicating means carried within the housing and including a rotatable indicator shaft, a spool secured to the shaft, a pair of cables attached to the spool and wrapped about the same in opposite directions, said cables extending from the periphery of the spool in opposite directions substantially at right angles to the axis of the shaft and in a common plane tangent to the periphery of the spool, one of said cables being extended down through the hollow member and attached to said float means for transmitting motion to the spool, and counterbalancing means attached to the other cable and serving to apply constant tension to both said cables.

3. In gauging apparatus for application to a liquid tank, a closed housing located exterior of the tank, a hollow member connecting the housing to the tank, a movable float disposed within the tank, indicating means carried within the housing and including a rotatable indicator shaft, a spool secured to the shaft, a sheave mounted on a horizontal axis and disposed upon one side of the indicator shaft in a plane substantially tangent to the periphery of the spool, a cable wrapped about the spool and extending in said plane to engage over said sheave and to thence extend downwardly for attachment to the float, another cable likewise wrapped about the spool and extending in said plane but in a direction opposite to that of the first cable, and counterbalancing means attached to said second named cable and serving to apply constant tension to both said cables.

EUGENE E. JURS.
JOHN J. DENHAM.